United States Patent [19]

Vitaloni

[11] 4,352,401
[45] Oct. 5, 1982

[54] MOTOR-CAR CONTROL GROUP

[75] Inventor: Massimo Vitaloni, Rivalta, Italy

[73] Assignee: Viel Elettromeccanica S.p.A., Chiusa S. Michele, Italy

[21] Appl. No.: 98,580

[22] Filed: Nov. 29, 1979

[30] Foreign Application Priority Data

| Nov. 30, 1978 | [IT] | Italy | 53941/78[U] |
| Feb. 13, 1979 | [IT] | Italy | 52948/79[U] |
| Feb. 13, 1979 | [IT] | Italy | 52949/79[U] |
| Feb. 13, 1979 | [IT] | Italy | 52950/79[U] |
| Sep. 14, 1979 | [IT] | Italy | 53565/79[U] |
| Sep. 14, 1979 | [IT] | Italy | 53566/79[U] |
| Nov. 12, 1979 | [IT] | Italy | 53739/79[U] |

[51] Int. Cl.³ ............................................ B60R 16/02
[52] U.S. Cl. ....................................... 180/90; 200/28; 200/61.27; 307/10 R
[58] Field of Search ............... 180/90, 78, 77 H, 77 R; 244/1 R, 234; 307/10; 340/79, 73; 200/52 R, 28, 61.27, 61.35; 362/37, 46

[56] References Cited

U.S. PATENT DOCUMENTS

| 3,857,454 | 12/1974 | Kobayashi et al. | 180/78 |
| 3,888,506 | 6/1975 | Haas | 180/90 X |
| 4,140,200 | 2/1979 | Tucek | 180/77 H |
| 4,180,713 | 12/1979 | Gonzales | 180/77 H X |

FOREIGN PATENT DOCUMENTS

| 2814821 | 11/1979 | Fed. Rep. of Germany | 180/90 |
| 1058738 | 3/1954 | France | 180/90 |

Primary Examiner—John P. Silverstrim
Attorney, Agent, or Firm—Sughrue, Mion, Zinn, MacPeak & Seas

[57] ABSTRACT

A motor-car control group includes two elongate control assemblies which project symmetrically from opposite sides of a cowling covering the steering column into zones immediately behind the steering wheel rim for ready finger-tip availability to the driver. Each assembly includes an end push-button switch and rings rotatable by means of a projecting fingerpiece or a knurled surface about a tubular support to control respective auxiliary electrical services, such as headlights or windscreen wipers, by cooperation of contacts on the rotatable rings with fixed contacts on respective adjacent fixed annuli. Instrument and indicator light assemblies may be mounted on the cowling leaving the dashboard free of obstruction, or the cowling and/or instrument assemblies may be integral with the dashboard.

33 Claims, 21 Drawing Figures

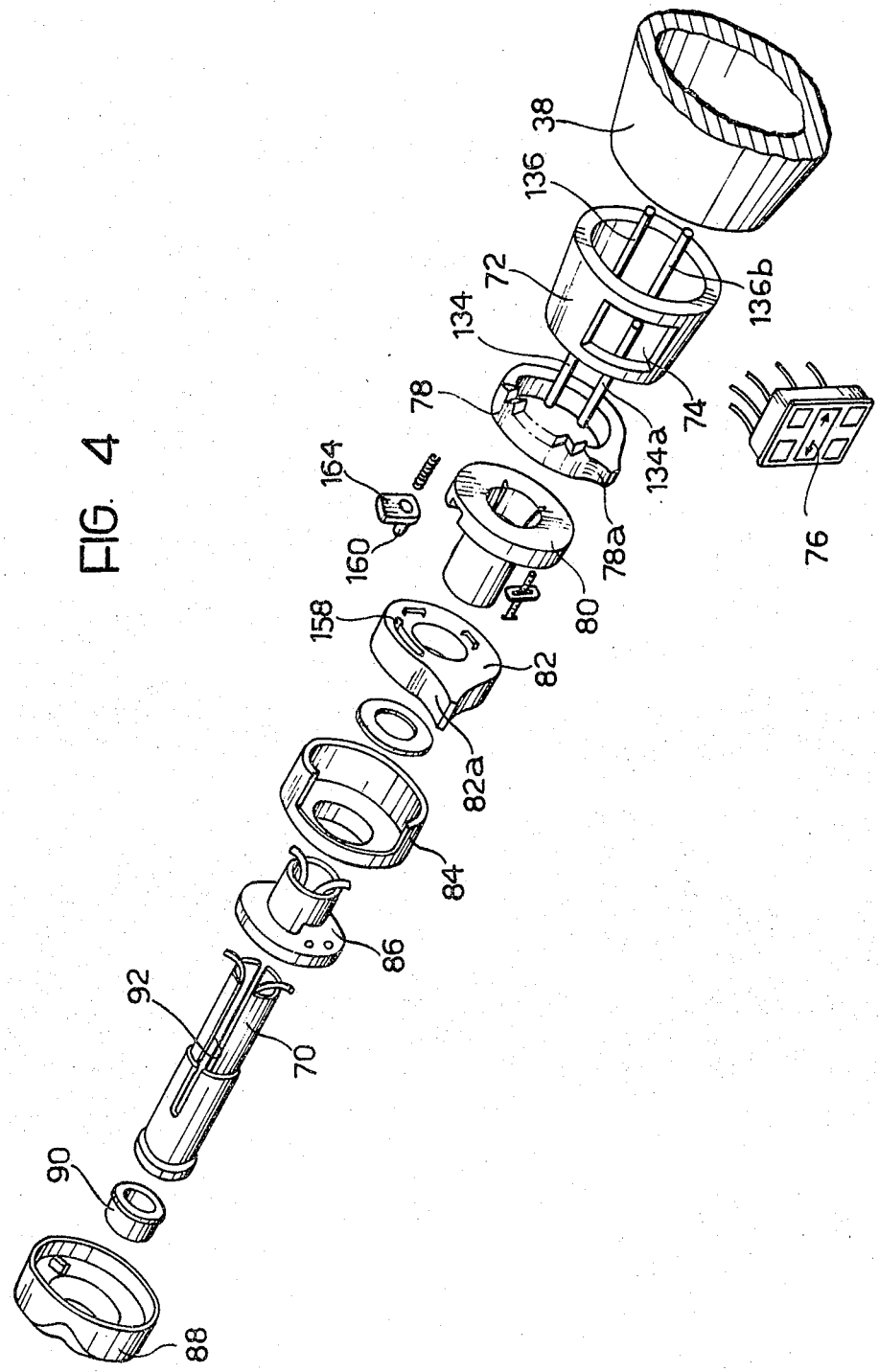

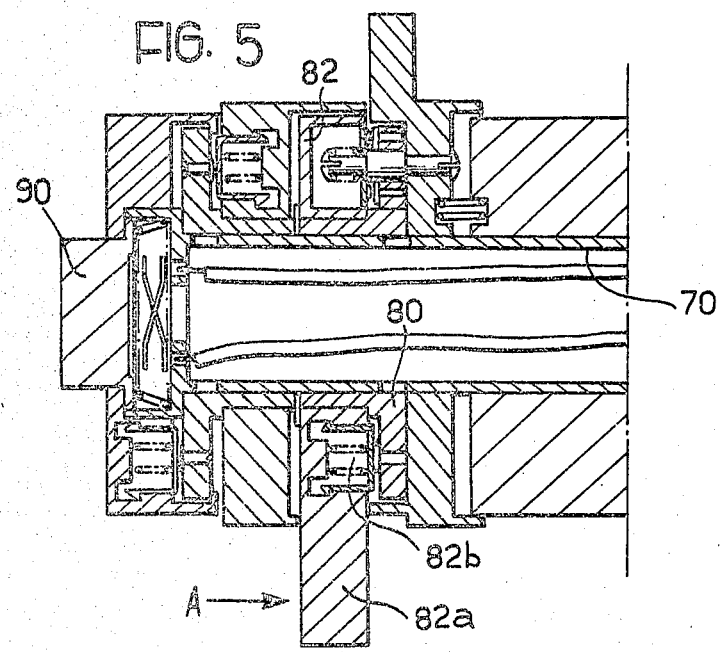
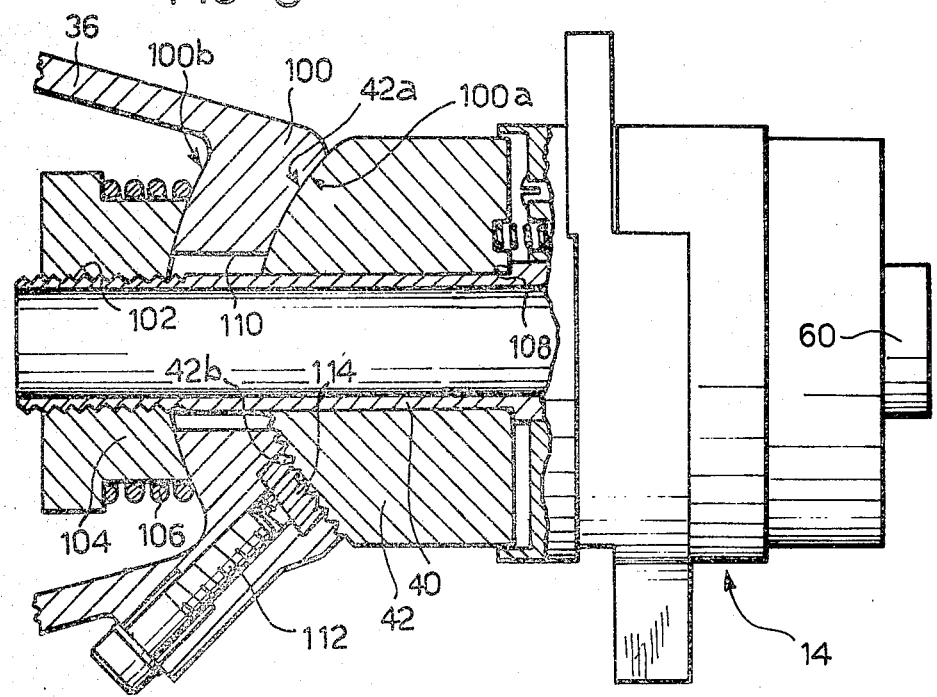

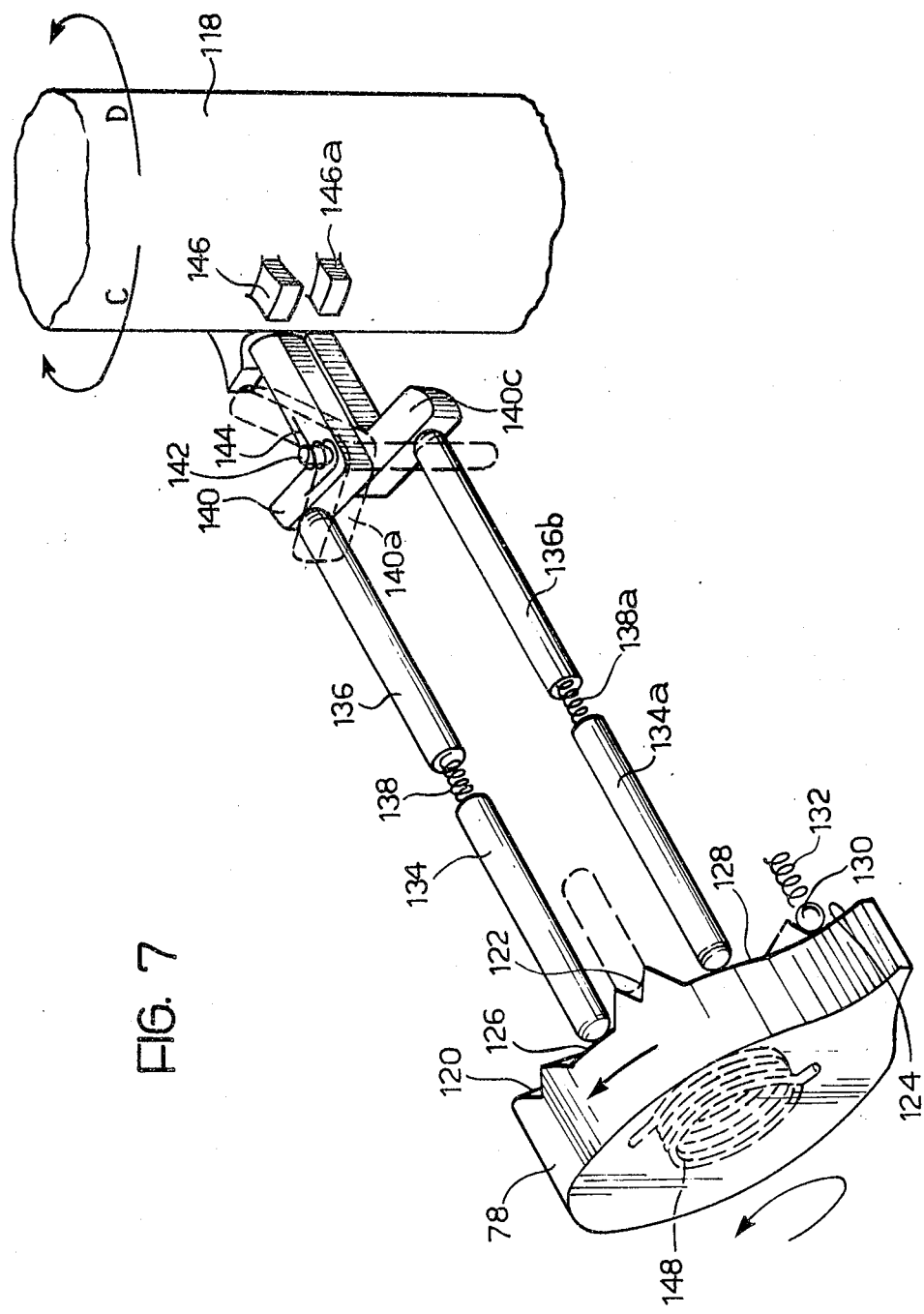

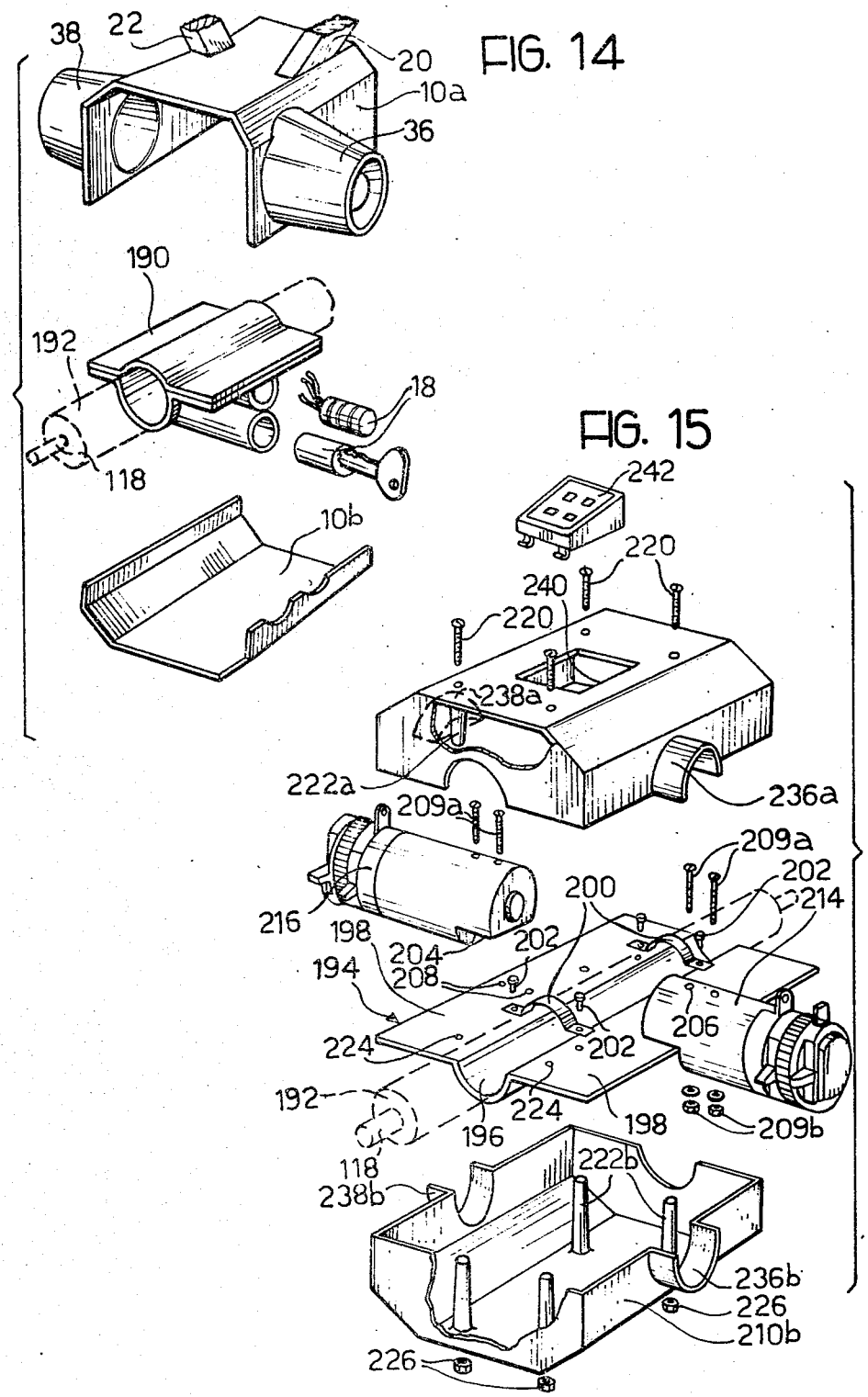

MOTOR-CAR CONTROL GROUP

The present invention relates to a control group for auxiliary services of a motor vehicle and has the object of providing a group of this type which offers the following advantages:

the possibility of ready and easy manipulation of a large number of controls for auxiliary services of the motor vehicle, such as the lights, direction indicators, windscreen wipers, windscreen washers, horn, etc., without the need for the driver to remove his hands from the steering wheel;

compact grouping of the controls behind the steering wheel such that the wheel protects the driver from injury against projecting parts of the controls in the case of a collision, and possibly also the elimination of projections from the dashboard of the motor vehicle to allow its use for other purposes, for example as a shelf.

According to the present invention there is provided a control group for auxiliary services of a motor vehicle, including at least one elongate control assembly connected at one end to a support structure for attaching the assembly to a structural part of the vehicle, in use, to support it therefrom such that the control assembly extends into a zone immediately behind the steering wheel rim, the assembly including manual controls for the auxiliary services at least some of which include rings rotatable about the axis of elongation of the assembly.

Several embodiments of the invention will now be more particularly described, by way of example, with reference to the accompanying drawings, in which:

FIGS. 3 and 4 are exploded perspective views of right- and left-hand control assemblies respectively of the group of FIGS. 1 and 2;

FIG. 5 is an axial sectional view of part of the left-hand body of FIG. 4;

FIG. 6 is an axial sectional view of part of the right-hand control assembly of FIG. 3 and of part of a support structure for the assembly;

FIG. 7 is a perspective view of a mechanism for controlling direction indicators of the motor vehicle, the mechanism forming part of the left-hand control assembly of FIG. 4 and being shown in a first position of operation;

FIG. 14 is an exploded perspective view of a central support structure of the control group of FIGS. 1 and 2, FIG. 15 is an exploded perspective view similar to FIG. 14, showing a variant of the central support structure of the group;

Figure 1:
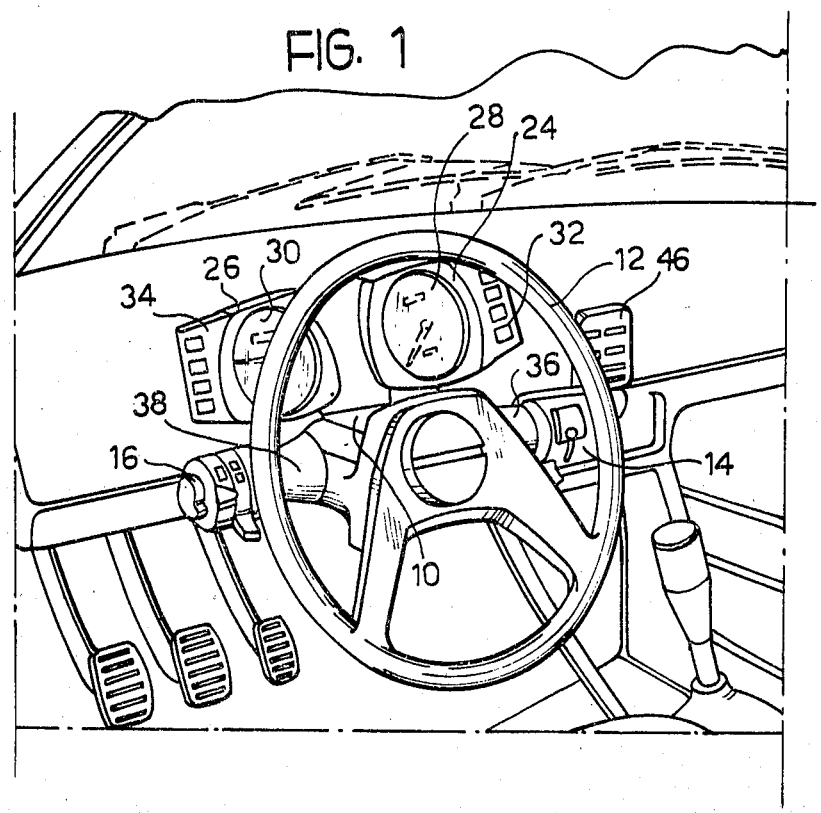
FIG. 1 is a perspective view of a control group according to a first embodiment of the invention associated with a steering wheel of a motor vehicle.
Figure 2:
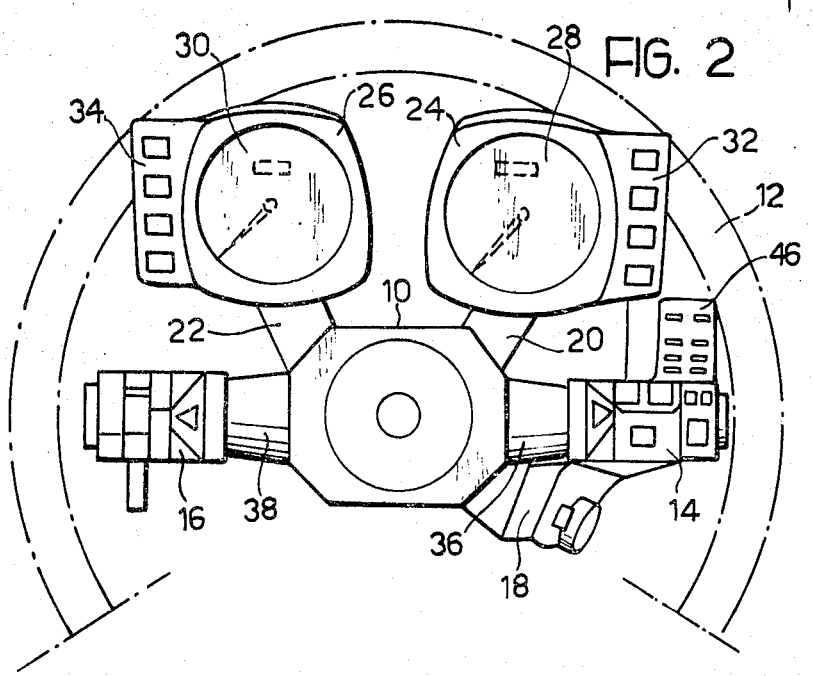
FIG. 2 is a front elevational view of the group of FIG. 1.

Referring to FIGS. 1 and 2 of the drawings, a control group according to the invention is shown assembled in a motor vehicle and includes a shaped cowling 10, for example of plastics material, which covers or incorporates part of the steering shaft (not shown) behind a steering wheel 12.

Right-hand and left-hand elongate, control assemblies 14, 16, respectively are attached to the cowling 10 and project one from each end thereof, on opposite sides of the vehicle steering column. The control assemblies 14, 16 are angularly adjustable, as will be described below with reference to FIG. 6, but are shown in their central positions in which they extend symmetrically from the cowling 10 along a common, horizontal axis, perpendicular to the longitudinal axis of the steering column carrying the steering wheel 12 and substantially in the same horizontal plane as the horizontal diameter of the steering wheel.

Close to the cowling 10, beneath the right-hand control body 14 is incorporated an ignition block 18 with an anti-theft, steering-lock device.

The two control assemblies 14, 16 each extend into a respective zone immediately behind the rim of the steering wheel 12, such that this acts as a shield to protect the driver from hurting himself against the projections on the assemblies 14, 16 in the case of a collision.

Two stalks 20 and 22 are fixed to the cowling 10 and support respective right-hand and left-hand combined instrument and indicator assemblies 24, 26 respectively. The housings of the assemblies may, for example, be of plastics material. The two assemblies 24 and 26 each carry a respective main dial 28, 30. In the example shown, the dial 28 is a revolution counter, while the dial 30 is a combined odometer and tachometer. The dials 28 and 30 may also incorporate other indicators, such as a thermometer with a needle for indicating the oil and water temperatures, a pressure gauge with a needle for indicating the oil pressure and a voltmeter for indicating the state of charge of the battery.

Each assembly 28, 30 has a lateral wing, a respective face 32, 34 of which is turned towards the driver and bears a cluster of indicator lights for indicating the state of operation of respective services of the motor vehicle, for example, the condition of the lights (side lights, full or dipped beam), the absence of brake fluid, the engagement of the hand brake etc.

As can clearly be seen from FIGS. 1 and 2, the disposition of the two instrument assemblies 28 and 30 and the respective wing faces 32 and 34 is such that these are all visible to the driver through the upper part of the steering wheel. Their disposition on the cowling 10 rather than on the dashboard has the double advantage of leaving the dashboard unencumbered and bringing the instruments closer to the driver's eyes.

The two control assemblies 14 and 16 are supported from the cowling 10 by means of respective lateral support appendages 36 and 38 which are attached symmetrically to the opposite sides of the cowling 10.

The details of the cowling 10 and support appendages 36 and 38 will be explained in greater detail below with reference to FIG. 14.

The structure of the right-hand control assembly 14 will now be described with reference to FIG. 3.

The support appendage 36 is tubular and is connected to one end of a cylindrical, tubular support element 40 by any suitable means, but preferably as described below with reference to FIG. 6.

Figure 3:
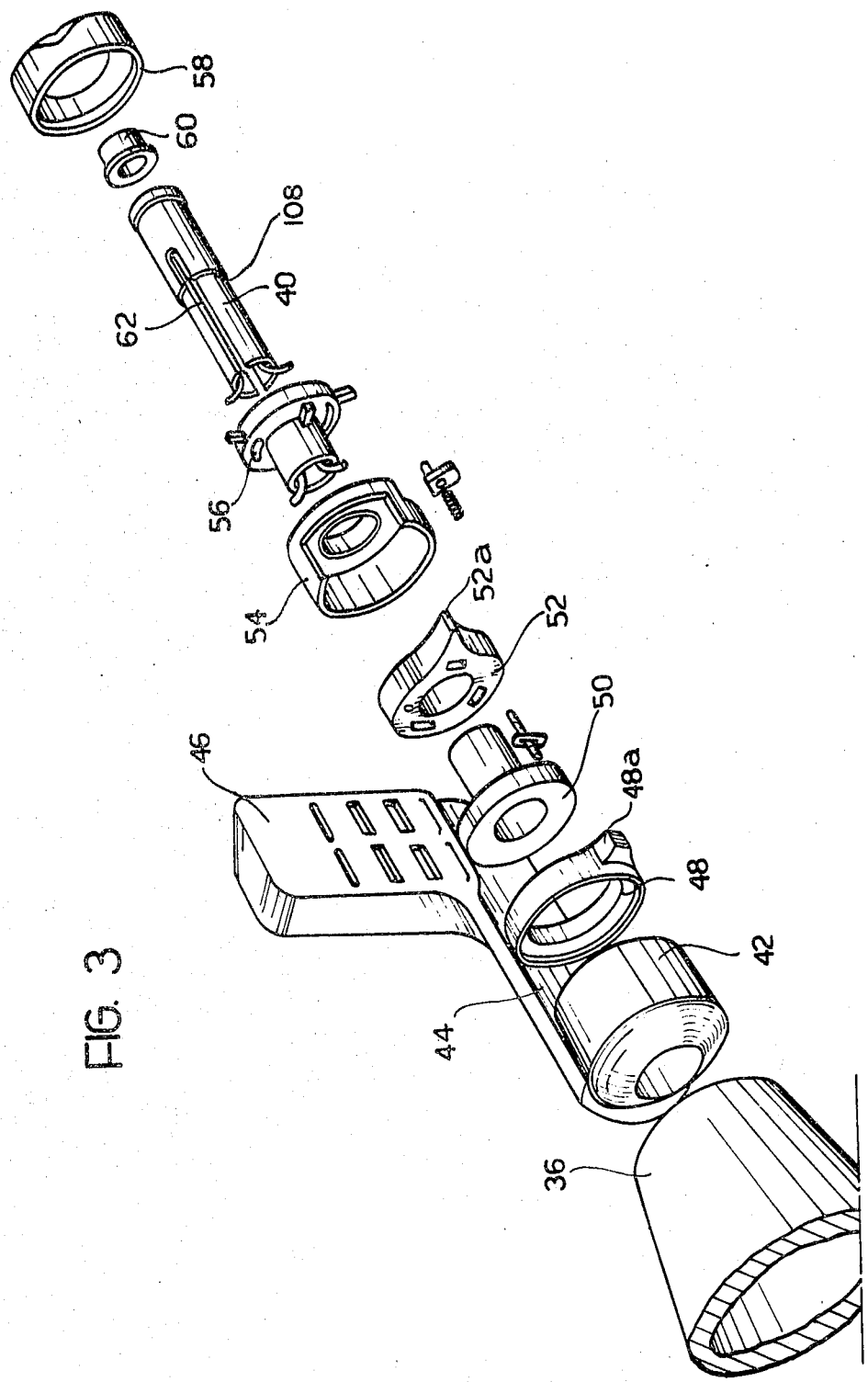

The following elements are mounted coaxially on the tubular element 40 such that they contact each other and are in the following sequence:

a sleeve shaped support collar 42 to which an arm 44 which supports an upstanding display panel 46 (also shown in FIGS. 1 and 2) is fixed, the panel carrying touch controls and possibly also indicator lamps;

a rotatable control ring 48 with a manually-operable, radially-projecting fingerpiece 48a, for example, for controlling rear windscreen wipers of the vehicle; the ring 48 is provided with contacts, movable with the ring, on its face not visible in FIG. 3;

a fixed annular element 50 having fixed contacts on its annular face turned towards the ring 48 for cooperating with the movable contacts of the ring 48;

a rotatable control ring 52, similar to the ring 48, provided with a radially-projecting fingerpiece 48a; the ring 52 controls, for example, the front windscreen wipers and has contacts movable with the ring on its annular face turned towards the fixed element 50 for cooperating with fixed contacts carried by the adjacent face of the element 50;

a rotatable control ring 54 in the form of a knurled drum for controlling, for example, hazard warning flashers; the ring 54 is provided with contacts movable with the ring on its annular face not seen in FIG. 3;

a further fixed annular element 56, similar to the annular element 50, which has fixed contacts on its face turned towards the ring 54 for cooperating with the movable contacts of the ring 54;

a further rotatable control ring 58, in the form of a knurled drum for controlling, for example, right- and left-hand parking lights of the vehicle; the ring 58 has contacts movable with the ring on its face turned towards the annular element 56, for cooperating with further fixed contacts carried by the adjacent face of the element 56;

a push-button switch 60 which can be activated by means of pressure exerted axially of the tubular element 40 towards the cowling 10; the switch 60 may, for example, control a windscreen washer.

One of the contacts carried by the fixed annular elements 50 and 56 is connected to the vehicle electrical circuit while another contact is connected to a respective electrically operated auxiliary service by means of an electrical cable which passes through a longitudinal slit 62 in the element 40, through the tubular element 40 itself and through the tubular appendage 36 into the cowling 10.

The structure of the control assembly 16 situated on the left-hand side of the cowling 10 is illustrated in FIG. 4 and corresponds substantially to the structure of the assembly 14 shown in FIG. 3.

To the tubular appendage 38 of the cowling 10 is fixed a partly-split, tubular, support element 70 on which the following control members are mounted in the sequence given:

a sleeve-shaped collar 72 provided with an aperture 74 in which a panel 76 is releasably mounted; the panel carries indicator lights for the direction indicators and a series of indicator lights related to other auxiliary services of the vehicle;

a rotatable control ring 78 provided with a radially projecting fingerpiece 78a for controlling, for example, the direction indicators; the ring 78 carries contacts movable with the ring on its annular face which is not visible in FIG. 4;

a fixed annular element 80 which has contacts on its face adjacent the ring 78, for cooperating with the movable contacts of the ring 78;

a control ring 82 which is rotatable and displaceable axially and is also provided with an operating fingerpiece 82a and carries contacts on its annular face turned towards the fixed element 80 for cooperating with fixed contacts carried by the adjacent face of the element 80; the rotation of the ring controls the commutation of the vehicle lights between three positions corresponding to activation of the vehicle side lights, dipped-beam headlights and full-beam headlights;

a rotatable control ring 84 in the form of a knurled drum;

a further fixed annular element 86;

a further rotatable control ring 88 in the form of a drum;

a push-button switch 90, similar to the switch 60 of FIG. 3, for controlling the horn.

The fixed annular element 86 has fixed contacts on each annular face for cooperating with movable contacts carried by the respective adjacent faces of the rings 84 and 88. The two rings 84 and 88 control respective auxiliary services, such as the activation of a heating element for the rear window of the vehicle and a fan of the ventilation-heating system of the vehicle interior.

As in the assembly of FIG. 3, the electrical cable, for connecting the fixed contacts to the vehicle electrical circuit and to the services which they operate pass through a longitudinal slit 92 into the tubular element 70 and thence through the tubular element 70 and appendage 38.

The operating fingerpieces, 48a, 52a, 78a and 82a project downwardly and/or towards the general plane of the steering wheel 12, as is seen in FIGS. 1 and 2, and are situated in a zone immediately outside the rim of the steering wheel 12. As will be understood, this allows the driver to operate the control rings 48, 52, 78 and 82 with a finger practically without taking his hands from the steering wheel.

The operation of the control groups mentioned above will be described with reference to the fixed element 80, rotatable ring 82 shown in FIG. 5, in which a movable contact carried by the ring 82 is shown as 82b.

In particular, displacement of the fingerpiece 82a of the ring 80 in the direction of arrow A displaces the movable contact 82b into contact with the corresponding fixed contacts carried by the annular element 80 and closes the lighting circuit for the headlights. A spring (not shown) interposed between the ring 82 and the annular element 80 biases the ring 82 out of engagement with the element 80, tending to open the lighting circuit. Thus the driver can flash the headlights simply by displacing the fingerpiece 82a with his finger and releasing it.

Referring to FIG. 6 of the drawings, part of the support structures for the two control assemblies 14 and 16 will be described with reference to the mounting of the assembly 14 on the appendage 36, the mounting of the assembly 16 on the appendage 38 being identical.

The tubular appendage 36 has an annular end wall 100 with an outwardly-facing spherically concave surface 100a and an internal spherically convex surface 100b while an adjacent end of the sleeve 42 has a spherically-convex surface 42a which cooperates with the surface 100a. The tubular support element 40 projects from the said end of the sleeve 42 into the tubular appendage 36 and is provided with external screw-threading 102 onto which a cooperating internally screw-threaded bush 104 having a peripheral flange 104a is screwed, a helical spring 106 being interposed between the flange 104a and the internal spherical surface 100b of the wall 100. The sleeve 42 bears axially against an annular step 108 cut in the external surface of the tubular element 40.

Screwing of the ring 104 on the element 40 increases or decreases the friction between the spherical surfaces 100a and 42a of the tubular appendage 36 and the sleeve 42 respectively according to the direction of screwing, allowing regulation of the friction in the connection which is effectively a ball joint.

The tubular element 40 extends through a central aperture 110 in the end wall 100 of the tubular appendage 36, the aperture having a diameter much greater than the diameter of the element 40. This allows radial play which allows the angular position of the tubular element 40, and hence of the whole control assembly 14, to be varied with respect to the central axis of the appendage 36 to allow the position of the assembly to be adjusted to suit the needs of the driver of the motor vehicle.

In order to lock the assembly 14 in a desired position, once its angular position has been adjusted conveniently, a screw 112 is provided in the wall 100 of the appendage 36, the screw being operable from outside the appendage 36 and acting at its inner end on a toothed wedge 114 which engages cooperating toothing 42b formed in the spherical surface 42a.

Figure 8:
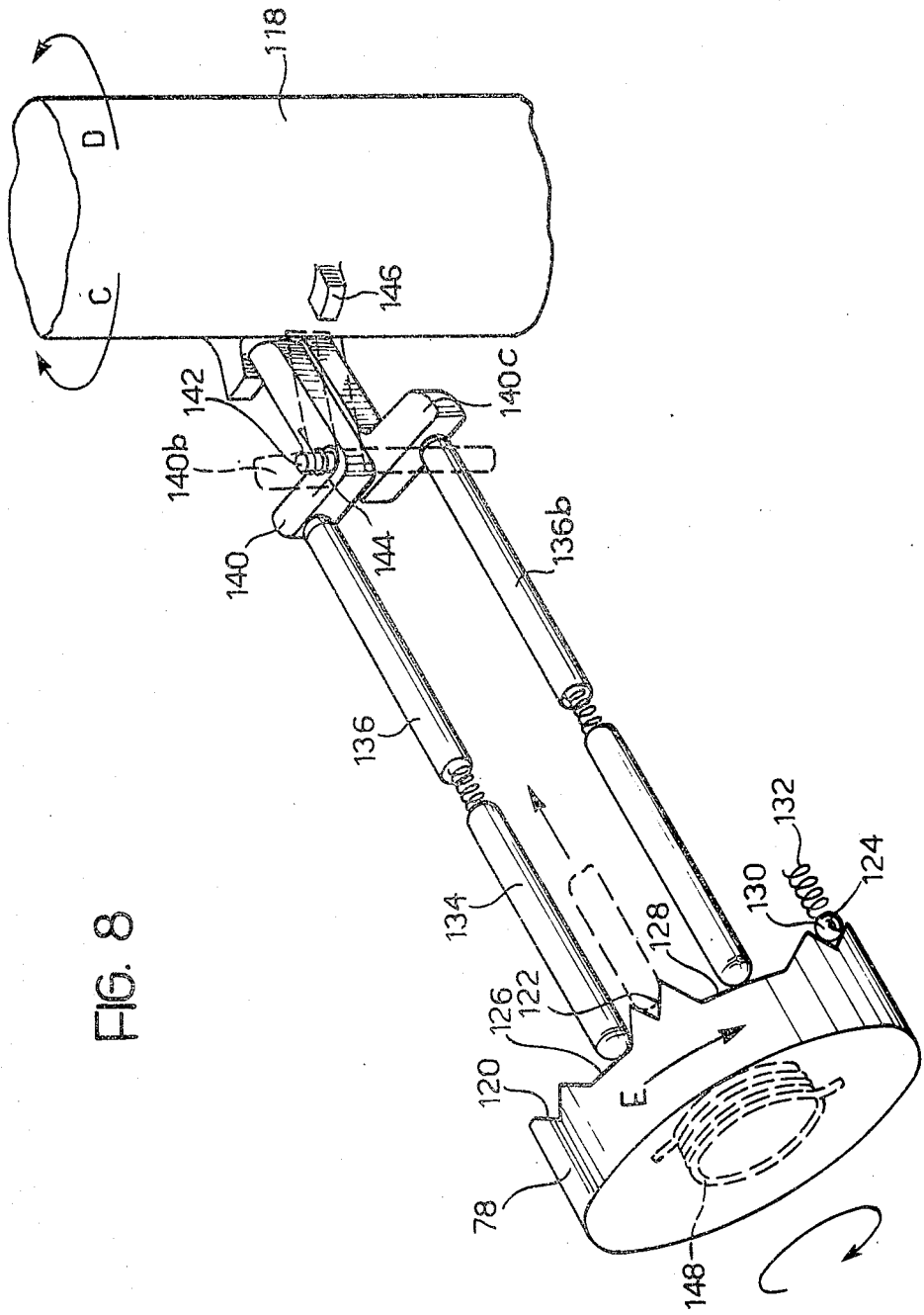
FIG. 8 is a perspective view similar to FIG. 7, illustrating the same control mechanism in a second position of operation.

Referring to FIGS. 7 and 8 of the drawings, a mechanism is shown for controlling the direction indicators including the control ring 78 of the left-hand assembly 16.

The ring 78 has three V-shaped notches 120, 122, 124 on its face turned towards the steering wheel shaft shown in these Figures as 118. These notches are separated by two wider, lands 126, 128. A ball 130 is urged into engagement with the notch 124 by a spring 132 incorporated in the collar 72 (see FIG. 4) to hold the ring 78 in a neutral position, corresponding to de-activation of the direction indicators.

A pair of rods, 134-136 and 134a-136a, extend longitudinally within the collar 72 and tubular appendage 38 and are engaged at one end each with a respective land 126, 128. Each rod consists of two sections 134 and 136 or 134a and 136a, spaced apart by respective helical springs 138, 138a respectively which extend axially of the sections 134, 136 or 134a, 136a.

The end of the section 136 which is closest to the shaft 118 is engaged with one arm of a bell-crank lever 140 which is rotatable about a pin 142 and is acted on by a return spring 114. The other arm of the lever 140 extends into the path of a tooth 146 carried by the shaft 118 and fixed for rotation therewith.

When the ring 78 is rotated in the direction of arrow B to indicate a change of direction, the rod 134 passes from the land 126 into the notch 122 adding a further load to the spring 138. In this position, a corresponding rotation of the shaft 118 of the steering column (that is, in the sense of the turn indicated), indicated by the arrow C, and hence of the tooth 146 which engages the pawl arm of the bell-crank lever 140, causes rotation of the lever 140 to the position indicated in broken lines in FIG. 7 at 104a, and causes axial displacement of the rod section 136 to increase the load on the spring 138 still further, the pawl arm then being released behind the tooth 146.

The ring 78 is resiliently biased by a torsion spring 148 which tends to return it to its neutral position; but the return does not occur at this stage since the effect of the compression of the spring 138 is sufficient to overcome the turning force of the spring 148.

During straightening out of the steering after a turn (arrow D) the tooth 146 acts in the opposite sense from previously on the lever 140, turning it to the position indicated at 140b in FIG. 8. This allows the spring 138 to decompress sufficiently to allow the spring 148 to return the ring 78 to its initial neutral position, in the direction of arrow E of FIG. 7.

The operation of the rod 134a, 136a is similar to, but in the opposite sense from, the rod 134, 136, the rod section 136a engaging a further bell-crank lever 140c, situated beneath the lever 140, and engageable by a second tooth 146a carried by the shaft 118.

Figure 9:
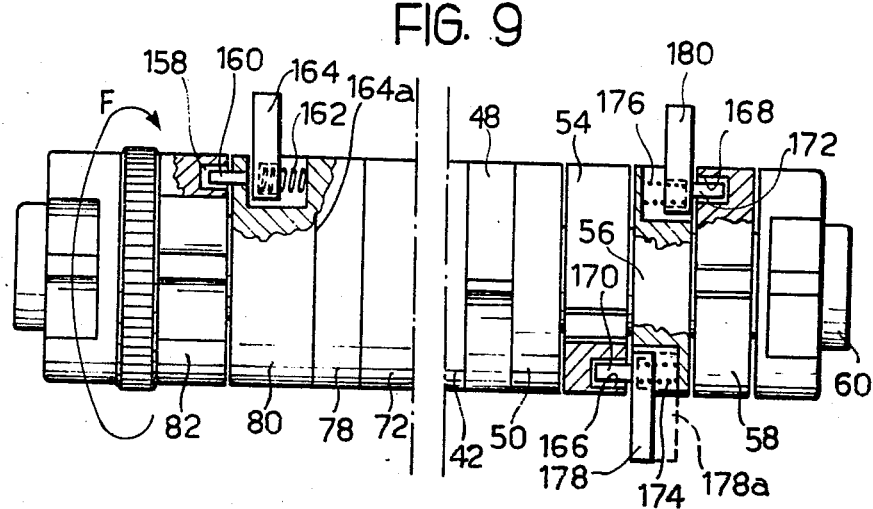
FIG. 9 is a partially-sectioned, elevational view of end portions of the two control assemblies of FIGS. 1 and 2 illustrating safety devices of the assemblies.
Figure 13:
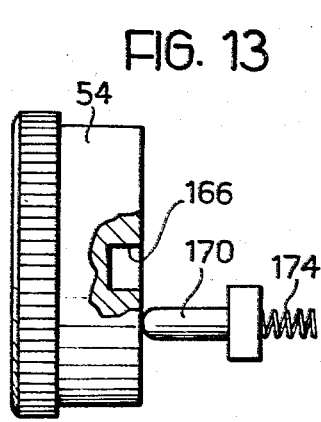

Referring now to FIGS. 9 and 13 of the drawings, safety devices associated with the rotatable ring 82 of FIG. 4 and rings 54 and 58 of FIG. 3 are shown.

The movable contacts carried by the ring 82 and the corresponding fixed contacts carried by the annular element 80 are arranged such that: the lights are deactivated in a first angular position of the ring 82; a first rotation of the ring 82 in the direction of the arrow F takes it into a second angular position corresponding to the activation of the side lights; a second rotation, still in the direction of arrow F, carries the ring 82 into a position corresponding to activation of the dipped-beam headlights; and, finally, a third rotation of the ring 82, still in the direction of the arrow F, carries it to a further position corresponding to the activation of the full beam headlights.

For safety reasons it is desirable that once the ring 82 has been turned to its position corresponding to operation of the dipped-beam headlights, its rotation may occur freely only between the positions corresponding to the full-beam headlights and the dipped-beam headlights respectively so that the user may not inadvertently turn the ring 82 back to operate the side lights only.

Thus a groove or detent 158 (also shown in FIG. 4) is provided in the face of the ring 82 turned towards the fixed annular element 80 and a pin 160, which cooperates with the groove 158 in the manner of a bolt, is mounted, for sliding movement parallel to the axis of rotation of the ring 82, in the fixed element 80. The pin 160 is thrust towards the ring 82 by a helical compression spring 162 incorporated in the element 80. The groove 158 extends along a circumferential arc.

A fingerpiece 164 carried by the locking pin 16 projects radially outwardly of the element 80 and may be pressed manually in the direction of arrow G, that is against the action of the spring 162, with the outer face of the thumb of the left hand, the other fingers of that hand being free to operate the ring 82 by means of the lever 82a.

Figure 10:
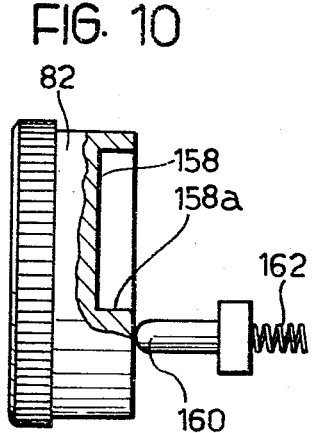
FIGS. 10 and 11 are diagrammatic representations of a first type of control ring of one of the control assemblies of FIG. 9 and of a safety device associated with it shown in two different respective conditions of operation.
Figure 11:
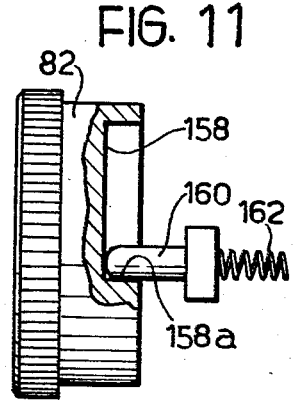

The relative dispositions of the ring 82 and of the locking pin 160 are such that when the ring 82 is in its first and second positions, corresponding to the lights being off or only sidelights being switched on, the locking pin 160 must be withdrawn from the groove 158, as shown in FIG. 10, against the force of the spring 162, and passage between these two positions occurs with sliding of the projecting end of the pin 160 along the adjacent annular face of the ring 82. During passage of the ring 82 from the second to the third position, corresponding to activation of the dipped headlights, the locking pin 160 shoots into the groove 158, as shown in FIG. 11. The arcuate length of the groove 158 corresponds to the angular spacing between the third and fourth positions (full beam headlights operated) of the ring 82, whereby the passsage of the ring 82 between these two positions occurs with sliding of the pin 160 along the bottom of the groove 158.

When the ring 82 is rotated so as to return it from the fourth to the third position, in the opposite sense to the arrow F, the pin 160 engages against a side wall 158a of the groove 158, preventing the ring from being rotated inadvertently into the second position in which only the sidelights are activated. The return to the second or the first position is only possible after withdrawal of the pin 160 from the groove 158 by pressure on the fingerpiece 164 in the direction of arrow G, that is to the position indicated in broken outline at 164a in FIG. 9.

Similar safety devices are provided for the rings 54 and 58 of the body 14 since it is desirable that these should not be displaceable inadvertently from their respective angular rest positions. For this purpose each ring 54, 58 has a respective detent 166, 168 in its face turned towards the adjacent fixed annular element 56 with which cooperate respective pins 170, 172, either similar to or identical to the pin 160, are resiliently biased into engagement with the rings 54, 58 by respective helical springs 174, 176 incorporated in the fixed annular element 56. The springs 174, 176 are identical to or similar to the spring 162 and have similar functions. Each pin 170, 172 has a respective projecting control fingerpiece 178, 180 similar to, or identical to, the fingerpiece 164 and provided for a similar purpose.

Figure 12:
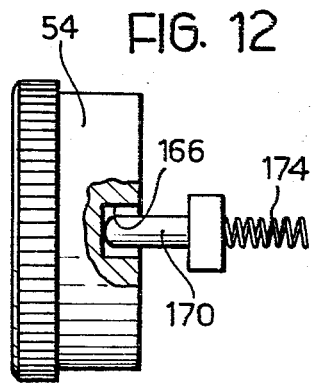
FIGS. 12 and 13 are diagrammatic representations similar to FIGS. 10 and 11 respectively of a second type of control ring and its safety device, again shown in two different positions of operation.

The cooperation of the ring 54 with its locking pin 170 is shown in FIGS. 12 and 13, the cooperation of the ring 58 with the pin 172 being identical. As shown in FIG. 13, when the control ring 54 is in its neutral position, the locking pin 170 engages in the detent 166, which is only slightly wider in a circumferential direction than the pin 170; thus it is not possible to move the ring 54 inadvertently to its working position.

In order to move the ring 54 to its working position, it is necessary to manipulate the fingerpiece 178 with a finger to force it against the action of the spring 174, to the position indicated in broken outline at 178a in FIG. 9 in which it is disengaged from the detent 166 and allows rotation of the ring 54, as shown in FIG. 13.

Similar manipulation of the fingerpiece 180 allows the ring 58 to be turned from its rest position to one or other of its working positions in which either the left-hand or right-hand parking lights are operated.

The arrangement of the safety system described above is not the only one possible. Thus, for example, the configuration and arrangement of the locking pin or bolt may be different from that shown. In particular, the locking pin may be carried by the rotatable ring and may cooperate with grooves or notches formed in the annular fixed elements.

One embodiment of the support structure of the control group according to the invention will now be described with reference to FIG. 14 which shows the cowling 10 and support appendages 36, 38 of FIGS. 1 and 2 in dismantled form.

The cowling 10 comprises an upper half-shell 10a and a lower half-shell 10b, the upper half-shell 10a having an upper wall on which the two stalks 20 and 22 (only partially shown) are mounted for supporting the instrument assemblies 24 and 26 shown in FIGS. 1 and 2.

The upper half-shell 10a has one pair of dependent, opposing side walls which each support a respective one of the tubular appendages 36 and 38, these being coaxial with each other and projecting in opposite directions, as stated above, to support the control assemblies 14, 16. The cowling 10 is thus a central support structure both for the control assemblies 14 and 16 and for the instrument assemblies 24 and 26, all of which may be fixed to the upper half-shell 10a before its assembly with half-shell 10b in the vehicle.

In this embodiment, the cowling 10 is attached to a metal support structure 190 which surrounds the rotatable steering wheel shaft 118. The structure 190 also supports the ignition block 18 and its anti-theft steering lock devices.

Referring to FIG. 15 of the drawings, a variant of the central support structure is shown in which the rotatable steering wheel shaft is again indicated as 118 and is again surrounded by the fixed sleeve 192. In this embodiment the main support comprises a plate 194 of strong sheet steel having a central, part cylindrical curved portion 196 for cooperating with the lower surface of the sleeve 192 and a pair of co-planar wings 198 attached to opposite longitudinal edges of the curved portion 196.

The plate 194 is fixed to the sleeve 192 by any suitable means, for example, the small bridges 200 shown in the drawing which have central curved portions which fit over the sleeve 192 and end flanges which are fixed to the plate 194 by means of screw threaded bolts or rivets 202.

Respective control assemblies 214 and 216, similar to the assemblies 14 and 16 of FIGS. 1 and 2 are fixed directly to the plate 194 rather than to appendages carried by a cowling, the direction of elongation of the assemblies 214, 216 being transverse the axis of the steering column in the case shown, as in the embodiment of FIGS. 1 and 2.

In this embodiment a tubular end portion of each assembly 214, 216, is cut away and provided with a planar face 204 which rests on the upper face of a respective one of the planar wings 198. This same end portion of each assembly 214, 216 is provided with a radial bore 206, the portions 198 having corresponding bores 208, each assembly 214, 216 being fixed to its respective wing 198 by means of screw threaded bolt 209a inserted in the bores 206 and 208, and cooperating nuts 209b. Thus the installation and removal of the assemblies 214 and 216 is achieved extremely simply.

Clearly, a bundle of electrical cables will extend from each control assembly 214, 216 and since it will be necessary to connect these cables into the vehicle electrical circuit or to disconnect them from it, suitable connectors (not shown) may be provided on the plate 194 for this purpose.

Controls similar to those of FIGS. 3 and 4 are assembled on the ends of the control assemblies 214, 216 remote from the plate 194 and will not be described further. The complex formed by the plate 194 and the attached ends of the control assemblies 214, 216 is covered by a cowling which consists of an upper half-shell 210a and a lower half-shell 210b, preferably of moulded plastics material.

The two half-shells have curved portions 236a, 236b, 238a, 238b projecting from respective side walls, which, when the half-shells are brought together, define tubular appendages similar to the appendages 34 and 36 of FIGS. 1 and 2, which embrace the inner end portions of the assemblies 214, 216 but, unlike the appendages 36, 38 do not have a support function for the assemblies 214 and 216.

The two half-shells 210a, 210b are held together on the wings 198 of the plate 194 by means of screw threaded bolts 220 which extend through elongate, tubular bosses 222a, 222b in the half-shells and through corresponding apertures 224 in the wings 198, and which cooperate with nuts 226.

The removal of the control bodies 214, 216 may only be achieved after the removal of the cowling 210a–210b. This requires the simplest of operations of unscrewing the screw threaded bolts 36.

The upper half-shell 210a has a planar upper wall in which a rectangular aperture 240 is formed. A panel 242 carrying indicator lamps is releasably mounted in the aperture when the control group is assembled.

In the embodiment shown in FIGS. 1 and 2, the control assemblies project laterally of the steering column into the zone immediately behind the steering wheel. One advantage of this disposition is that, it allows a great number of controls for the auxiliary services associated with driving to be reached readily and easily.

In the control assemblies of FIGS. 1 and 2, the rings provided with fingerpieces are generally suitable for controlling services which are controlled by levers associated with the steering wheel in most widely used motor vehicle models. These functions are:

the change from dipped-beam to full-beam headlights;

the control of direction indicators (winking lights);

the control of windscreen wipers.

Since the axis of rotation of the control rings of the embodiment described is transverse the axis of the steering column, the operation of these rings is not the same as that of elongate levers associated with the steering wheels of many vehicle models, which are operated by long arcuate movements around the periphery of the steering wheel.

Figure 16:
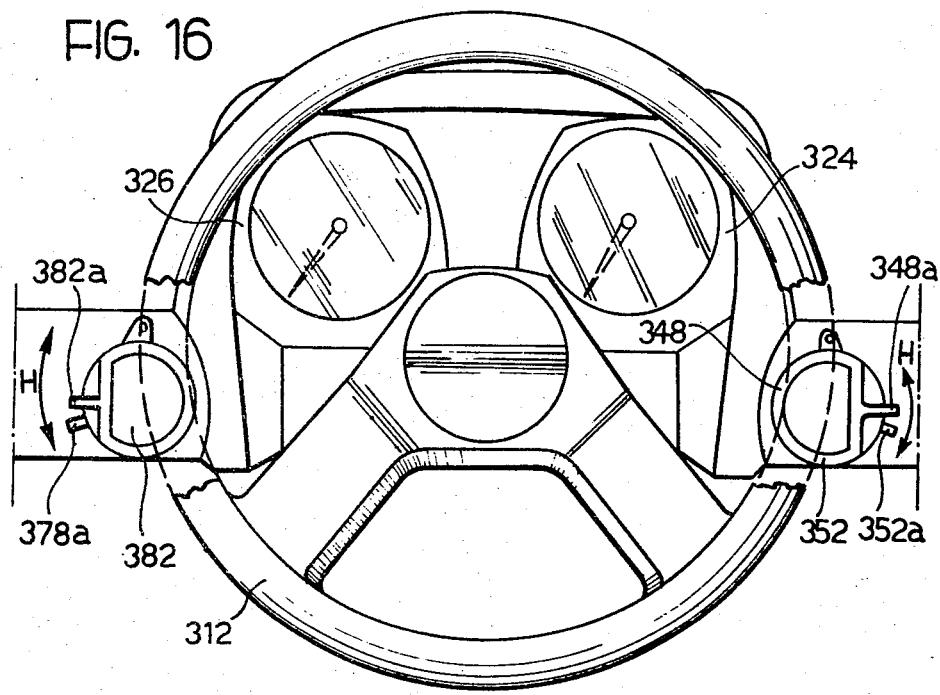
FIG. 16 is a front elevational view of a second embodiment of a control and instrument group according to the invention, associated with a steering wheel of a motor vehicle.
Figure 17:
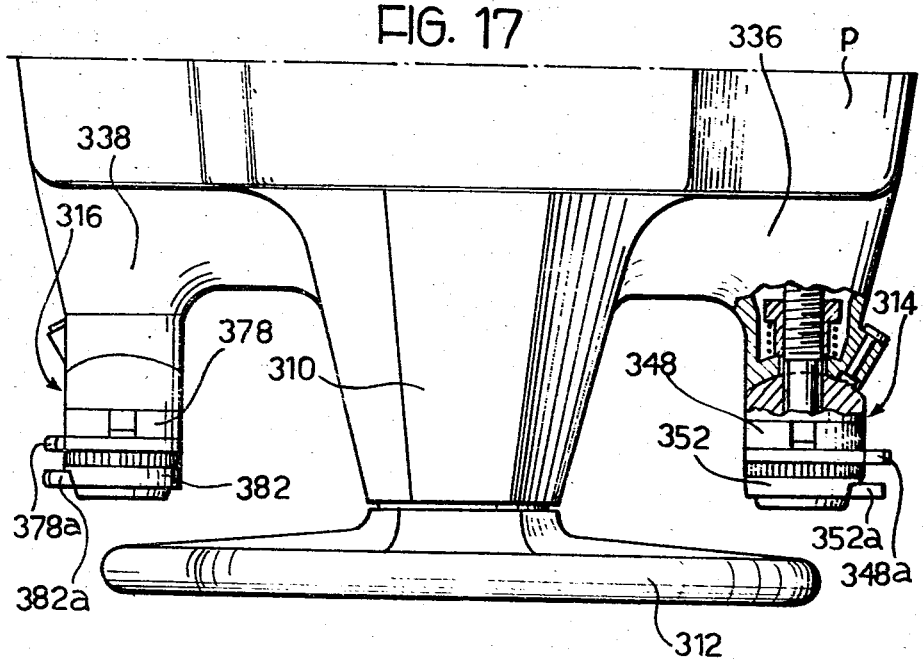
FIG. 17 is a plan view from above of the group of FIG. 16.

For certain drivers this may be a disadvantage since they may find difficulty in accomplishing manipulations which are different from those to which they have become accustomed, especially over long periods. FIGS. 16 and 17 of the drawings thus show a further embodiment of the invention in which the advantages of the control group described above are combined with the advantage of a particular arrangement of the group which allows the fingerpieces of the rings to be controlled by movements similar to those required for operating the traditional elongate levers mentioned above, thus eliminating the difficulty which certain drivers may have in driving a motor vehicle provided with a control group of FIGS. 1 and 2.

Referring to FIGS. 16 and 17, a cowling 310, which may be similar to that of FIG. 14 or that of FIG. 15 and which has a corresponding internal support plate, projects from the dashboard structure P of a motor vehicle and may carry instrument bodies 324 and 326 (shown in FIG. 16 only). The cowling surrounds the upper part of the steering wheel shaft which carries the steering wheel 312.

Control assemblies 314, 316 are provided one on each side of the cowling 310 and of the steering wheel shaft. These assemblies are disposed symmetrically with respect to the steering column and are oriented with their axes substantially parallel to each other and to the axis of the steering wheel shaft itself at least in their central angular position, such that they project rearwardly from the dashboard structure P towards the steering wheel 312 and lie behind the rim of the wheel.

Each assembly 314, 316 may be identical to or similar to the corresponding body 14 or 16 of FIGS. 1 to 4 and is carried by a respective appendage 336, 338 which supports it in a manner similar to the support of the assemblies 14 and 16 by the tubular appendages 36 and 38 described above.

Each appendage 336, 338, is advantageously of moulded plastics materials and is fixed to the dashboard structure P and/or to the cowling 310, or to a support contained in the cowling. Alternatively the assemblies may be attached to wing portions of a plate similar to the plate 194 of FIG. 15, the cowling simply covering the main support structure.

As in the embodiment of FIGS. 1 to 4, each assembly 314, 316 carries various controls for the auxiliary services of the motor vehicle, the right-hand assembly 314 having, among others, a pair of rotatable rings 348 and 352, fingerpieces 348a and 352a having functions which may be identical to those of the rings 48 and 52 of FIG. 3.

The left-hand assembly 316 has, among others, two rings 378, 382, with respective fingerpieces 378a, 382a, the functions of which rings may be the same as those of the rings 78 and 82 of FIG. 4.

As may be seen in FIGS. 16 and 17, all the fingerpieces 348a, 352a, 378a, 382a are situated in a zone immediately behind the steering wheel 312 and project radially outwardly with respect to the rim of the wheel such that they are accessible to the driver without the need for him to release his hold on the steering wheel.

The operation of the rings 348, 352, 378, 382 by means of their fingerpieces 348a, 352a, 378a, 382a, respectively, is effected in the direction indicated by the double arrow H in FIG. 16, that is, by an arcuate movement along the periphery of the steering wheel 312, as in most widely-used motor vehicles.

Figure 18:
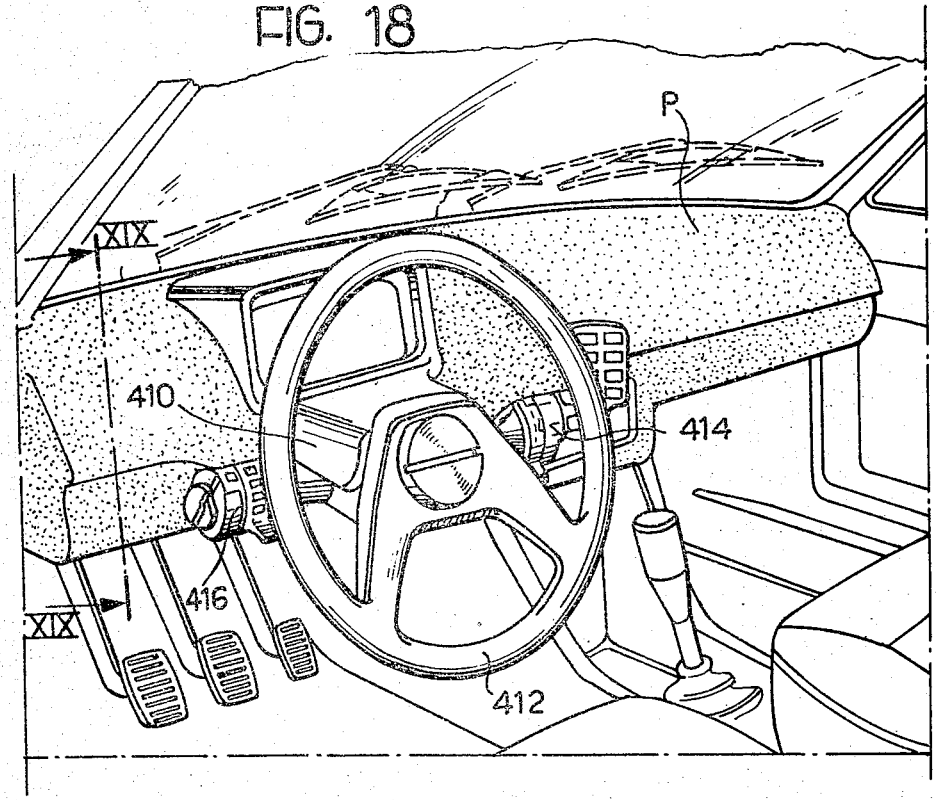
FIG. 18 is a perspective view of a third embodiment of a control group according to the invention, associated with a steering wheel, of a motor vehicle.
Figure 19:
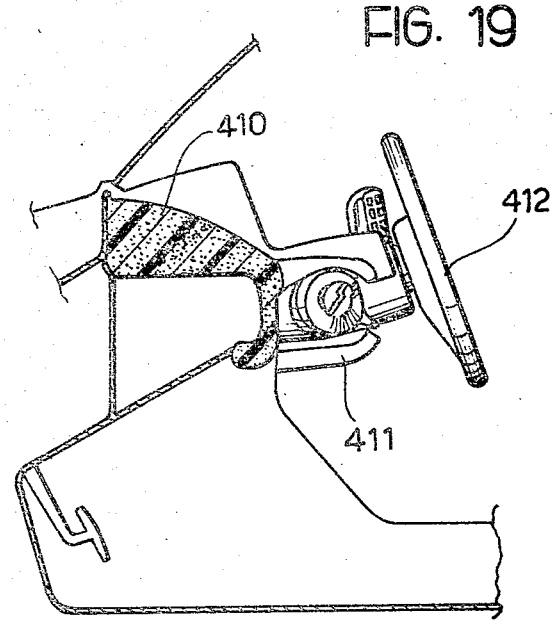
FIG. 19 is a sectional view in a vertical plane taken longitudinally of the vehicle indicated by line XIX—XIX of FIG. 18.

In FIGS. 18 and 19 a third embodiment of a control group according to the invention is shown.

In this third embodiment parts similar to or the same as those illustrated in FIGS. 1 and 2 are indicated by the same reference numerals increased by 400.

The embodiment of FIGS. 18 and 19 differs from that of FIGS. 1 and 2 essentially in that the upper part of the cowling, indicated as 410, consists of an integral appendage of the dashboard structure P and extends above the central part of the control group.

The formation of the cowling as the appendage 410 allows the construction of the control group to be simplified and, at the same time, provides continuity of the surface of the dashboard structure P and the central portion of the steering wheel column housing.

In the embodiment of FIGS. 18 and 19, a lower appendage 411 also extends from the dashboard structure P to complete the cowling of the control group and contribute to the protection of the driver in the case of accident.

Preferably the appendages 410 and 411 are of a soft material.

The system for fixing the two control bodies 414 and 416 of the embodiment of FIGS. 18 and 19 may advantageously be of the type illustrated in FIG. 15.

Figure 20:
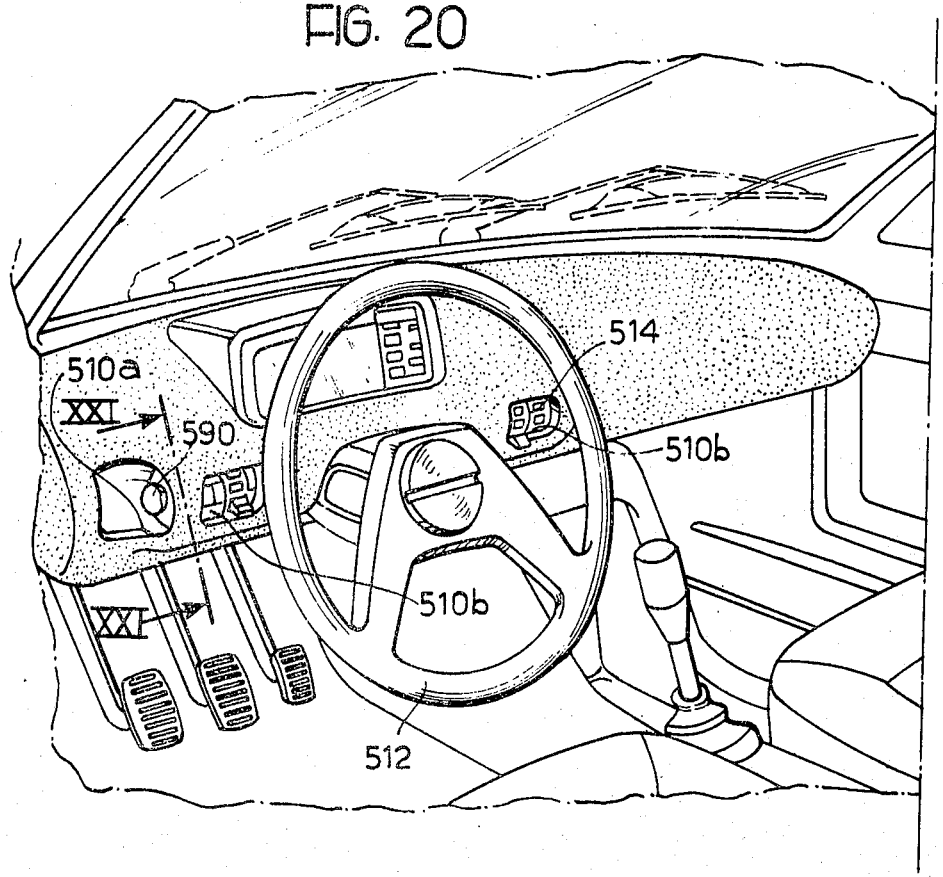
FIG. 20 is a perspective view, similar to FIG. 18, of a control group according to a fourth embodiment of the invention.
Figure 21:
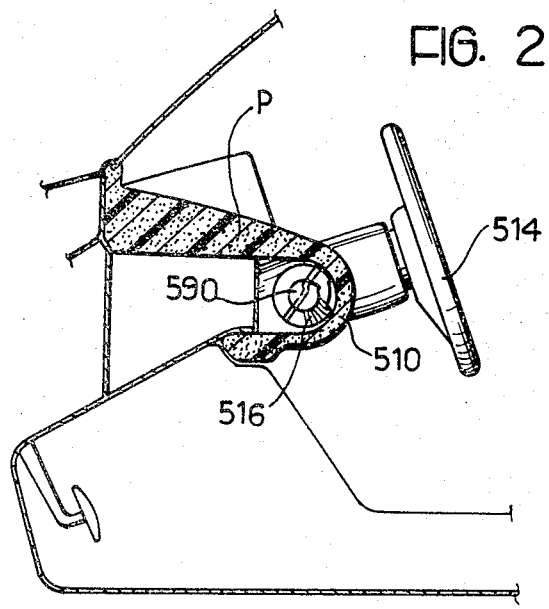
FIG. 21 is a sectional view in a vertical plane, similar to FIG. 19 indicated by lines XXI—XXI of FIG. 20.

In FIGS. 20 and 21 a fourth embodiment of a control group according to the invention is shown. In this Figure the parts similar to or identical to those of FIGS. 1 and 2 are indicated by the same reference numerals increased by 500.

The embodiment of FIGS. 20 and 21 differs essentially from that of FIGS. 1 and 2 in that the cowling, indicated as 510, is integral with the dashboard structure P and has a substantially semi-cylindrical transverse section, with the substantially semi-cylindrical surface facing rearwardly of the vehicle.

The control group includes a pair of control assemblies 514 and 516 which are incorporated in the cowling 510, this latter being provided with apertures 510a at each end for access to push-button switches, such as switch 590, carried at the end of the control assemblies. The cowling 510 is also provided with intermediate axially-extending apertures 510b for access to the fingerpieces of the rotatable control rings of the assemblies 514 and 516.

The cowling 510 is preferably of a soft material and ensures efficient protection for the driver in case of an accident.

What is claimed is:

1. A control group for auxiliary services of a motor vehicle, including at least one elongate control assembly and a support structure connected to one end of the control assembly and attachable to a structural part of the vehicle, in use, to support the control assembly so that the latter extends into a zone immediately behind the steering wheel rim, the control assembly including manual controls for the auxiliary services, at least some of said manual controls including rotatable rings, wherein the control assembly includes a central tubular support element which extends along the axis of elongation of the assembly and which has a longitudinal slit, one end of the tubular support element being carried by the support structure and at least one of said control rings being mounted for rotation on the tubular support element and about the axis of the latter, and wherein the control assembly further includes at least one annular element fixed to the tubular support element, one adjacent each control ring, each annular element and adjacent ring having adjacent annular faces and carrying respective cooperating electrical contacts on said adjacent annular faces, and electrical cables connected to the contacts of each annular element and extending from said contacts, through said longitudinal slit, into the central tubular support element and through the latter for connecting the contacts to control respective services of the vehicle.

2. Control group as claimed in claim 1, wherein the support structure, in use, surrounds part of the steering wheel shaft behind the steering wheel when attached to the vehicle structural part.

3. Control group as claimed in claim 2, wherein the control assembly is connected to the support structure whereby, in the installed control group, the axis of elongation of the body and of rotation of the control rings is transverse the longitudinal axis of the steering wheel shaft.

4. Control group as claimed in claim 3, wherein at least one of the control rings has a radially projecting fingerpiece constituting a control member for the ring, arranged to project downwardly or towards the general plane of the steering wheel in a zone immediately behind and outside the steering wheel rim in the installed condition of the control group.

5. Control group as claimed in claim 3 or claim 4, including two said control assemblies which project symmetrically from the support structure such that, in the installed condition, they are located on opposite respective sides of the steering wheel shaft and extend with their longitudinal axes substantially horizontal and substantially perpendicular to the longitudinal axis of the steering wheel shaft.

6. Control group as claimed in claim 2, wherein the control assembly is connected to the support structure such that, in the installed condition, the axis of elongation of the assembly and of rotation of the rings is substantially parallel to the longitudinal axis of the steering wheel shaft, and wherein at least one of the rings has a radially projecting fingerpiece constituting a control member for the ring which, in the installed condition, is arranged to project radially outwardly with respect to the steering wheel rim.

7. Control group as claimed in claim 6, including two said control assemblies having substantially parallel axes, which, when installed, are situated symmetrically on opposite respective sides of the steering wheel shaft.

8. Control group as claimed in claim 6 or claim 7, wherein the support structure is attachable to the dashboard of the motor vehicle.

9. Control group as claimed in claim 1, wherein at least one of the controls includes a push button switch mounted at the free end of the control assembly and operable by manual pressure exerted towards the support structure in the direction of elongation of the assembly, said push button switch having a contact located at the free end of the tubular support element.

10. Control group as claimed in claim 1, wherein the support structure for said slitted tubular support element includes:
 a tubular appendage which is supported from said structural part of the vehicle, said appendage having an annular end wall with an outwardly-facing spherically concave surface, said end wall having a central aperture;
 a sleeve-shaped collar through which said tubular support element extends and from one end of which said one end of the tubular support element extends with radial play through said central aperture and projects into said tubular appendage, said collar having a spherically convex surface which cooperates with said concave surface of the end wall of the tubular appendage, and said one end of the tubular support element having an external screw-threading;
 an internally screw-threaded bush which is screwed onto said external screw threading, said bush having a peripheral flange;

and a helical spring interposed between said flange and the end wall of said tubular appendage, said spring biasing said cooperating concave and convex surfaces into frictional engagement with each other and said sleeve bearing axially against an annular step on the tubular support element to take the thrust of the spring;

whereby screwing of said bush on said one end of the tubular support element increases or decreases the friction between said cooperating spherical surfaces according to the direction of screwing, allowing regulation of the friction.

11. Control group as claimed in claim 10, wherein a locking screw is provided in the end wall of the tubular appendage, said screw being operable from outside of the appendage and acting at its inner end on a toothed wedge which engages cooperating toothing formed in the convex spherical surface of the said sleeve.

12. Control group as claimed in claim 1, wherein the support structure includes a cowling, for surrounding part of the steering wheel shaft immediately behind the steering wheel, and at least one support appendage fixed to the cowling laterally of the steering wheel shaft, in the installed condition of the group, and a respective appendage connected to one end of the tubular support of the control assembly.

13. Control group as claimed in claim 12, wherein the cowling comprises upper and lower half shells engageable with a metal support structure adapted for attachment to a fixed sleeve surrounding the steering wheel shaft.

14. Control group as claimed in claim 12 wherein said at least one support appendage is tubular.

15. Control group as claimed in claim 1 wherein the support structure comprises a metal support plate adapted for attachment to a fixed sleeve surrounding the steering wheel shaft, the support plate having a wing portion disposed, in use, to one side of the steering wheel shaft, the tubular support of the control assembly having one end portion fixed to the wing portion while the controls are grouped on the opposite end portion of the assembly.

16. Control group as claimed in claim 15, including a cowling adapted to be attached to the support plate to cover the plate, the fixed sleeve which surrounds the steering wheel shaft and the said one end portion of the tubular support.

17. Control group as claimed in claim 16, wherein the cowling comprises an upper and a lower half-shell adapted to be fitted above and below the steering wheel shaft respectively.

18. Control group as claimed in claim 15, including a cowling having an upper part formed integrally with and projecting, in the installed control group, forwardly of a dashboard structure of the motor vehicle, the upper part extending over the support plate in the installed condition of the group.

19. Control group as claimed in claim 18, wherein the cowling further includes a lower part also formed integrally with, and projecting forwardly of, the dashboard structure in the installed control group, which lower part extends below the support plate and, together with the upper part completes the cowling which surrounds the support plate and attached end portion of the control assembly, in use.

20. Control group as claimed in any one of claims 12 to 18, including an upstanding instrument assembly carried by the cowling and having at least one dial which is visible to the driver through the upper part of the steering wheel in the assembled condition of the control group.

21. Control group as claimed in claim 20, having two adjacent said instrument assemblies.

22. Control group as claimed in claim 20, wherein the instrument assembly is supported from the cowling by means of a respective stalk.

23. Control group as claimed in claim 12, including a display panel carrying indicator lights and wherein the cowling has an upper part provided with an aperture in which the display panel is releasably mounted.

24. Control group as claimed in claim 1, including a cowling which is integral with and projects forwardly of a dashboard structure of the motor vehicle.

25. Control group as claimed in claim 24, wherein the cowling is of substantially semi-cylindrical form, extends parallel to and surrounds the control assembly and is provided with an end aperture and an axially-extending aperture for access to the controls.

26. Control group as claimed in claim 1, wherein at least one said control assembly includes an upstanding display panel carrying touch controls and/or indicator lights.

27. Control group as claimed in claim 1, wherein the control assembly includes: a ring which is rotatably mounted on the tubular support to control vehicle turn indicators; a torsion spring acting upon said ring and biasing it towards an angular rest position, said ring being provided with notches; spring-loaded rods engaging in said notches at one end; right-angled levers against which the opposite ends of said rods react; bearing teeth carried by the rotatable shaft of the steering wheel, said levers projecting into the path of said bearing teeth and said rod consisting of two sections; and a helical compression spring separating said sections, said spring being loaded when the ring is rotated to a position corresponding to a vehicle turn indication, the compression of said helical spring being relieved by the action of the teeth on a respective said right angled lever during straightening-up of the steering wheel to allow the automatic return of the ring to its rest position under the action of the respective torsion spring.

28. Control group as claimed in claim 1, including a manually-operable locking bolt carried by one of the pair of elements constituting said rotatable control ring and the adjacent, cooperating fixed annular element, said locking bolt being engageable in a seat formed in the other of the said pair of elements, in at least one predetermined relative angular position of said elements, to prevent accidental displacement of the rotatable ring from one angular position to another, the locking bolt having a projecting control member operable by a finger of the same hand which is used to operate the rotatable control ring in use of the control group.

29. Control group as claimed in claim 28, wherein the locking bolt comprises a pin slidable in a peripheral portion of one of the said pair of elements parallel to the axis of rotation of the control ring, and including spring means resiliently biasing said pin towards the other of the pair of elements, the seat opening into the annular face of the said other element adjacent the said one element, and wherein the manually operable control member comprises a fingerpiece carried by the pin which projects radially outwardly with respect to the said elements.

30. Control group as claimed in claim 28 or claim 29, wherein the locking bolt is carried by the fixed annular element and the seat is formed in the rotatable control ring.

31. A control group for auxiliary services of a motor vehicle, including at least one elongate control assembly and a support structure connected to one end of the control assembly and attachable to a structural part of the vehicle, in use, to support the control assembly so that the latter extends into a zone immediately behind the steering wheel rim, the control assembly including manual controls for the auxiliary services, at least some of said manual controls including rings rotatable about the axis of elongation of the assembly, and the control assembly further includes at least one fixed annular element, one adjacent each control ring, and a manually-operable locking bolt carried by one of the pair of elements constituting said rotatable control ring and the adjacent, cooperating fixed annular element, said locking bolt being engageable in a seat formed in the other of the said pair of elements, in at least one predetermined relative angular position of said elements, to prevent accidental displacement of the rotatable ring from one angular position to another, the locking bolt having a projecting control member operable by a finger of the same hand which is used to operate the rotatable control ring in use of the control group.

32. Control group as claimed in claim 31, wherein the locking bolt comprises a pin slidable in a peripheral portion of one of the said pair of elements parallel to the axis of rotation of the control ring, and including spring means resiliently biasing said pin towards the other of the pair of elements, the seat opening into the annular face of the said other element adjacent the said one element, and wherein the manually operable control member comprises a fingerpiece carried by the pin which projects radially outwardly with respect to the said elements.

33. Control group as claimed in claim 31 or claim 32, wherein the locking bolt is carried by the fixed annular element and the seat is formed in the rotatable control ring.

* * * * *